March 23, 1954
M. B. MENTLEY ET AL
2,672,716
LEAD FORMING OR CHECKING FIXTURE
Filed Jan. 21, 1952
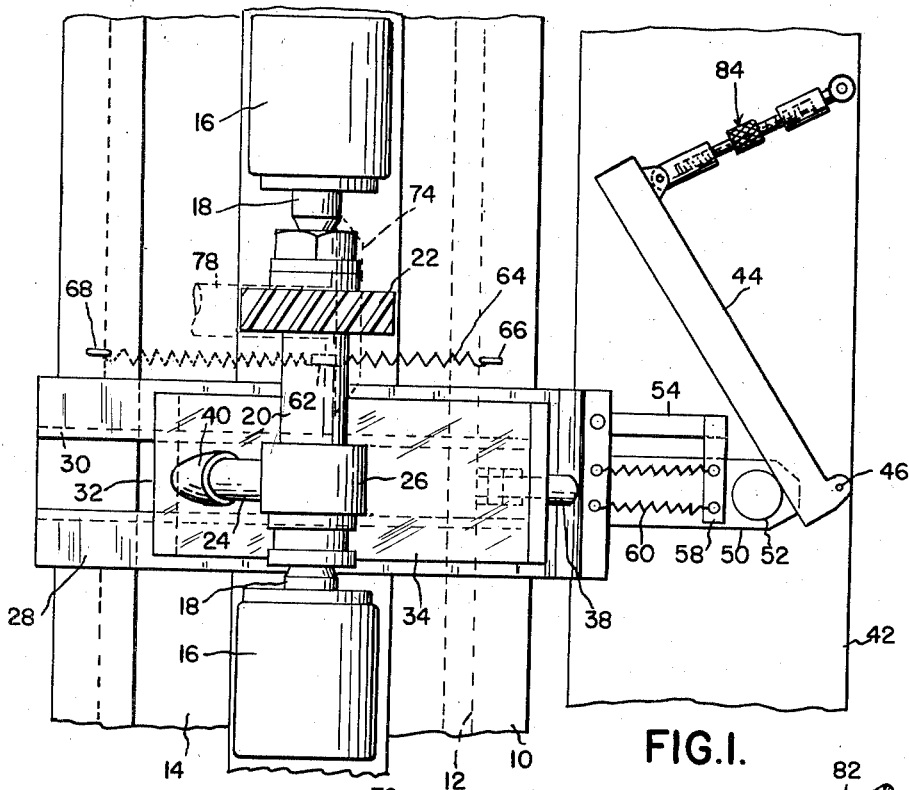
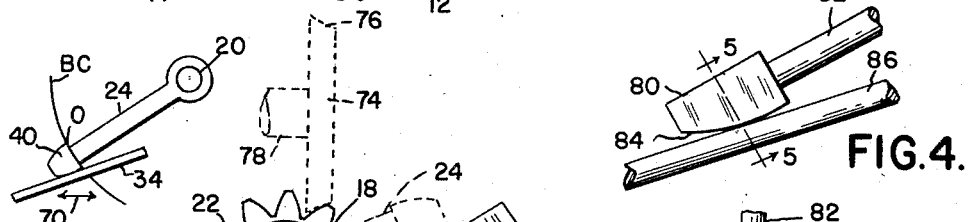
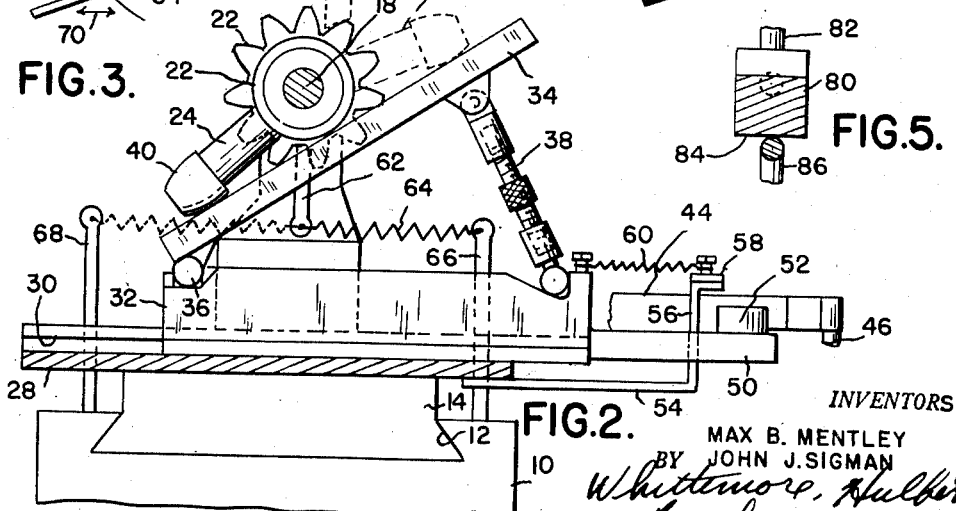
INVENTORS
MAX B. MENTLEY
JOHN J. SIGMAN
BY Whittemore, Hulbert
& Belknap ATTORNEYS

Patented Mar. 23, 1954

2,672,716

UNITED STATES PATENT OFFICE 2,672,716

LEAD FORMING OR CHECKING FIXTURE

Max B. Mentley and John J. Sigman, Detroit, Mich., assignors to National Broach & Machine Company, Detroit, Mich., a corporation of Michigan Application January 21, 1952, Serial No. 267,396

7 Claims. (Cl. 51—232)

The present invention relates to a lead forming or checking fixture.

The present invention is designed to produce uniform rotational motion of a member in response to or in accordance with uniform axial movement of the member and accordingly, the mechanism may be employed either to generate lead on a member when employed in conjunction with a metal working tool such for example as a grinding wheel, or the mechanism may be associated with suitable checking instruments, in which case it will be useful to check the lead or helix angle of a helicoidal surface.

It is an object of the present invention to provide simplified mechanism based upon sound geometric principles designed to generate a true lead.

It is a further object of the present invention to provide mechanism for generating true lead, useful in either a metal working or checking device which employs an element having an involute surface thereon carried by the rotatable member and acting in conjunction with a sine bar.

More specifically, it is an object of the present invention to provide mechanism designed to produce uniform rotational motion in accordance with axial movement of a member by producing relative motion between a sine bar located in a plane perpendicular to the axis of the member and an actuating arm secured to the member having an involute surface in contact with the sine bar.

It is a feature of the present invention to provide mechanism comprising a support, a first slide movable rectilinearly on the support, a member mounted on the first slide for rotation about a fixed axis parallel to the direction of motion of the first slide, a second slide mounted on the first slide for rectilinear motion thereon in a direction perpendicular to the axis of said member, sine bar mechanism for effecting uniform movement of said second slide in accordance with uniform movement of said first slide, an element rigidly carried by said member having an involute surface thereon, the origin of which is spaced from the axis of said member by a distance equal to half the diameter of the base circle of the involute, and a sine bar carried by said second silde having its surface in contact with the involute surface of said element.

It is a further feature of the present invention to provide mechanism of the character described in which said element is in the form of an involute acorn of circular transverse cross-section and having side surfaces which are involute in any axial plane, and means for biasing the involute element into contact with its associated sine bar, said biasing means being reversible so that either one side or the diametrically opposite side of said element may contact the sine bar to produce clockwise or counterclockwise rotation of the member upon translation of the first slide in the same direction.

It is a further feature of the present invention to provide as a new article of manufacture for use in mechanism of the character described, an involute acorn which is of circular cross-section in planes perpendicular to its axis and which has side surfaces which are of identical involute in any axial plane.

Other objects and features of the invention will become apparent as the description proceeds, especially when taken in conjunction with the accompanying drawings, wherein:

Figure 1 is a fragmentary plan view of the mechanism including the lead forming or checking fixture.

Figure 2 is an end elevation of the mechanism illustrated in Figure 1, with parts in section.

Figure 3 is a diagrammatic view illustrating the geometrical principle involved.

Figure 4 is a fragmentary elevational view of a modified form of involute element and sine bar.

Figure 5 is a section on the line 5—5, Figure 4.

Referring now to Figure 1, the mechanism comprises a base 10 having rectilinear ways 12 in which a slide 14 is mounted for rectilinear motion. The slide 14 carries head and tailstocks indicated generally at 16 which include rotary spindles 18 adapted to support a rotary member 20. As illustrated herein, the rotary member 20 carries a gear 22. It will be appreciated that where the mechanism illustrated herein is used as a grinding fixture, suitable index mechanism will be provided to permit indexing of the gear 22.

Mounted on the rotary member 20 is an arm 24 which as herein illustrated includes a sleeve 26 by means of which the arm 24 may be clamped to the member 20.

Mounted on the slide 14 is a plate 28 having ways 30 formed therein which extend perpendicular to the axis of the rotary member 20. Mounted in the ways 30 for rectilinear movement therein is a second slide 32. The slide 32 is provided with an adjustable sine bar 34 herein illustrated as pivoted to the second slide 32 about an axis indicated at 36 and having an adjusting turnbuckle device indicated generally at 38. By operation of the turnbuckle device 38 the angularity of the sine bar 34 may be adjusted as required.

The arm 24 at its outer end is provided with an element 40 which includes an involute side surface in slidable contact with the adjacent surface of the sine bar 34. Preferably, the element 40 is in the form of an acorn which is of circular cross-section in any plane perpendicular to its axis and having its side surfaces of the same involute form in any axial plane. The element 40 either with or without its supporting arm 24, is considered to be a new and useful article of manufacture. The element 40 may be mounted for rotation about its axis relative to the arm 24 whereby the involute surface thereof in contact with the sine bar 34 may be varied at will. Thus, after a period of use the element 40 may be adjusted to bring new elements of its surface into coaction with the sine bar.

The base 10 includes a supporting portion 42 which is stationary with respect thereto. Mounted on the support portion 42 is a second sine bar 44 which is mounted for angular adjustment about a pivot axis indicated at 46 and which includes suitable mechanism, herein illustrated as a turnbuckle 48, for effecting angular adjustment of the sine bar 44. The slide 32 includes a projection 50 provided with a roller 52 adapted to engage the sine bar 44.

Secured to the plate 28 is a bracket 54 which includes an upwardly extending portion 56 carrying a transversely extending strap 58. Intermediate the strap 58 and the adjacent end of the upper slide 32 are a plurality of tension springs 60 which bias the upper slide 32 to the right to maintain the roller 52 in contact with the sine bar 44.

Secured to the rotary member 20 is an arm 62 the outer end of which is connected to a tension spring 64 which may be connected to a post 66 or a post 68 to apply a counterclockwise biasing force to the member 20. Thus, when the spring 64 connects the arm 62 to the post 66 it biases the rotary member 20 in a counterclockwise direction and brings the involute acorn 40 into contact with the sine bar 34 in the position illustrated in full lines in Figure 2. If the spring were connected to the post 68 the rotary member 20 would be rotated clockwise until the involute acorn 40 contacted the sine bar 34 in the position illustrated in dotted lines in Figure 2.

Referring now to Figure 3, there is diagrammatically shown the relationship between the sine bar 34, the involute acorn 40, and the rotary member 20. From this figure it will be observed that the arm 24 is of such length with respect to the involute acorn that the origin of the involute surface of the acorn, which is designated in this figure as 0, is located at a distance from the axis of the rotary member 20 which is equal to half the diameter of the base circle BC of which the side surface of the involute acorn 40 is an involute. From the foregoing it will be apparent that if uniform traverse is imparted to the sine bar 34 in the direction of the arrow 70, uniform rotation is imparted to the member 20. It will further be apparent that the amount of rotation will depend upon the angular adjustment of the sine bar 34.

Moreover, it will likewise be apparent that if uniform translation is imparted to the lower slide 14 in the direction of the ways 12, the sine bar mechanism including the sine bar 44 and the roller 52 will impart uniform translation to the upper slide 32 in a direction perpendicular to the direction of movement of the lower slide 14. It will further be apparent that the rate of translation imparted to the upper slide 32 will be dependent upon the angular adjustment of the sine bar 44.

From the foregoing it will be apparent that when the lower slide 14 is moved along the ways 12 at a uniform rate, the upper slide 32 is moved along its ways 30 at a uniform rate dependent upon the angularity of the sine bar 44 and at the same time uniform rotation is imparted to the rotary member 20 dependent upon the angularity of the sine bar 34. Moreover, it will be apparent that the direction of rotation of the member 20 resulting from movement of the lower slide 14 in a given direction will be dependent upon whether the involute acorn 40 is in the full line or the dotted line position shown in Figure 2.

The mechanism so far described may be used in conjunction with a machine for producing helicoidal surfaces. Thus, in Figure 2 there is indicated in dotted lines a grinding wheel 74, the surface of which as indicated at 76 may be trimmed to involute shape. It will be understood that when the mechanism is employed in a grinder, the grinding wheel 74 in use will be rotated about the axis of a supporting shaft 78 and will be maintained in space while the slide 14 is reversed. Since uniform traverse of the slide 14, as previously described in detail, results in uniform rotational movement of the member 20, this uniform rotational movement will be imparted to the gear 22 and accordingly, the grinder may be used to grind involute helicoidal surfaces on the gear. Where the mechanism is employed for grinding gear teeth indexing mechanism will be provided intermediate the rotary member 20 and the gear 22 to permit shifting of the gear 22 relative to the rotary member 20 to grind all of the teeth successively.

The same mechanism may be employed to check the accuracy of previously produced helicoidal surfaces by mounting an indicator of conventional type in such position that the ball contact thereof engages a helicoidal surface on the work piece. If this helicoidal surface extends at a true lead, translation of the slide 12 and resultant uniform rotation of the gear 22 will of course not produce any movement of the indicator contact ball. Thus the mechanism is useful either in producing or trueing helicoidal surfaces, or in checking the accuracy of previously formed or trued helicoidal surfaces.

As previously stated, the use of the involute acorn 40 provides a multiplicity of portions of the involute acorn with respect to rotation about its axis, so that if wear develops along one side of the acorn it may be shifted slightly to bring a new and unworn involute surface into contact with the sine bar 34.

However, in its broadest aspect the invention does not depend upon the use of the acorn as illustrated herein. Thus, in Figures 4 and 5 there is illustrated an element 80 carried by an arm 82 having one surface 84 thereof formed to involute shape. The surface 84 is equivalent to one side of a spur involute tooth and includes straight line elements parallel to the axis about which the arm 82 is pivoted. In this figure there is illustrated a sine bar 86 which may be a flat bar, but which is herein illustrated as a round bar. The bar 86 may be mounted for rotational adjustment about its axis so as to bring new surfaces into contact with the involute element 80, and provision may be made for relative lateral adjustment to bring the sine bar 86 into contact with different portions of the involute surface 84.

While for simplicity the mechanism has been illustrated as comprising a lower slide 14 slidable on a stationary base 10 and carrying a transverse upper slide 32, it will be appreciated that equivalent results could be obtained where the slide 14 were stationary and the relative motion required to produce rotary movement of the member 20 results from translation of a member in the position of the support 42. In this latter case the indicating instrument or the grinding wheel, or the like, would be mounted on the slide occupying the position of the support 42. The resultant rotary movement of the member 20 would be accomplished in precisely the same manner as previously described in detail. Other variations and changes in arrangement of the mechanism may obviously be made. The important consideration is that the rotational movement of the rotary member results from transverse movement of a sine bar acting in conjunction with an involute surface so designed that the origin of the involute is spaced from the axis of the rotary member a distance equal to half the diameter of the base circle of the particular involute.

There is thus provided single mechanism including simple adjustments which may be employed to produce the required motion to form or check helicoidal surfaces extending at any selected helix angle and on parts having any selected diameter. The mechanism is extremely accurate. As is well known, the accuracy which may be obtained from sine bars is of the highest type. The involute acorn 40 or the involute element 80 may readily be produced to provide contacting involute surfaces which are of extreme accuracy. The mechanism is further characterized by its flexibility in that it is possible to reverse the mechanism simply by changing the connection of the spring 64 to form or check helicoidal surfaces of either right or left hand.

The drawings and the foregoing specification constitute a description of the improved lead forming or checking fixture in such full, clear, concise and exact terms as to enable any person skilled in the art to practice the invention, the scope of which is indicated by the appended claims.

What we claim as our invention is:

1. Mechanism for generating a true lead which comprises a base, a first slide movable rectilinearly on said base, a second slide movable rectilinearly on said first slide at right angles to the direction of movement of said first slide, a rotary support on said first slide, cam means in the form of a first sine bar on said base, a cam follower on said second slide engageable with said first sine bar to move said second slide laterally with respect to said first slide upon movement of said first slide, a second sine bar on said second slide, an arm extending from said rotary support, and an involute follower on said arm in engagement with said second sine bar, said involute follower being in the form of an acorn of circular transverse cross-section having side surfaces which are involute in axial cross-section.

2. Mechanism for imparting uniform rotational movement to a member in response to uniform axial movement thereof comprising an element having an involute surface thereon, rigid means for supporting said element from said member spaced from its axis of rotation a distance equal to the base radius of the involute, a sine bar in contact with the involute surface of said element and movable in a direction perpendicular to movement of said member, and means for effecting uniform movement of said sine bar in accordance with uniform movement of said member in the direction of its axis, said element being in the form of an acorn of circular transverse cross-section having side surfaces which are involute in axial cross-section.

3. Mechanism as defined in claim 2 comprising means for supporting said acorn on said rigid means for rotation about its axis.

4. In mechanism of the character described, an involute acorn for sliding action against a sine bar, said acorn comprising support means mounting it for bodily angular movement about an axis at a predetermined distance therefrom, said acorn being of circular transverse cross-section and having sides which in axial cross-section are involutes of a base circle equal to twice the amount of said predetermined distance.

5. Mechanism for imparting uniform rotational movement to a member in response to uniform relative axial movement between said member and another part which comprises an arm operatively connected to said member for rotation therewith, an element at the outer end of said arm having a side surface thereon which is an involute of a base circle whose diameter is equal to twice the distance from the axis of said member to the origin of the involute, a sine bar movable in a path perpendicular to the direction of relative movement between said member and part, said sine bar being in contact with the involute surface of said element, and means for imparting uniform movement to said sine bar in response to uniform relative movement between said member and said part, said element being in the form of an acorn of circular transverse cross-section having side surfaces which are involute in axial cross-section.

6. Mechanism for imparting uniform rotational movement to a member in response to uniform relative axial movement between said member and another part which comprises an arm operatively connected to said member for rotation therewith, an element at the outer end of said arm having opposite side surfaces which are involutes of a base circle whose diameter is equal to twice the radial distance from the axis of said member to the origin of said involutes, a sine bar movable in a path perpendicular to the direction of relative movement between said member and part, said sine bar being in contact with one of the involute surfaces of said element, and means for imparting uniform movement to said sine bar in response to uniform relative movement between said member and said part, said arm and element being rotatable through an arc of more than 180 degrees to bring either of the said diametrically opposed sides opposite surfaces of said element into contact with the sine bar to provide for rotation of said member in opposite directions upon relative movement between said member and part in the same direction.

7. Mechanism as defined in claim 6, and reversible spring means effective to bias one side or the other of said acorn into contact with the sine bar.

MAX B. MENTLEY.
JOHN J. SIGMAN.

References Cited in the file of this patent

UNITED STATES PATENTS

| Number | Name | Date |
|---|---|---|
| 515,595 | Linden | Feb. 27, 1894 |
| 2,294,733 | Brady | Sept. 1, 1942 |
| 2,387,166 | Miller | Oct. 16, 1945 |
| 2,456,407 | Green | Dec. 14, 1948 |
| 2,574,112 | Kopec | Nov. 6, 1951 |